US010026400B2

(12) United States Patent
Gelfenbeyn et al.

(10) Patent No.: US 10,026,400 B2
(45) Date of Patent: Jul. 17, 2018

(54) GENERATING DIALOG RECOMMENDATIONS FOR CHAT INFORMATION SYSTEMS BASED ON USER INTERACTION AND ENVIRONMENTAL DATA

(71) Applicant: Google LLC, Mountain View, CA (US)

(72) Inventors: Ilya Gennadyevich Gelfenbeyn, Sunnyvale, CA (US); Artem Goncharuk, Arlington, VA (US); Ilya Andreevich Platonov, Berdsk (RU); Pavel Aleksandrovich Sirotin, Sunnyvale, CA (US); Olga Aleksandrovna Gelfenbeyn, Yurga (RU)

(73) Assignee: GOOGLE LLC, Mountain View, CA (US)

( * ) Notice: Subject to any disclaimer, the term of this patent is extended or adjusted under 35 U.S.C. 154(b) by 227 days.

(21) Appl. No.: 14/901,026

(22) PCT Filed: Jun. 27, 2013

(86) PCT No.: PCT/RU2013/000551
§ 371 (c)(1),
(2) Date: Dec. 27, 2015

(87) PCT Pub. No.: WO2014/209157
PCT Pub. Date: Dec. 31, 2014

(65) Prior Publication Data
US 2016/0217784 A1    Jul. 28, 2016

(51) Int. Cl.
*G06F 17/27*    (2006.01)
*G06F 17/21*    (2006.01)
(Continued)

(52) U.S. Cl.
CPC ........... *G10L 15/22* (2013.01); *G06F 3/04842* (2013.01); *G10L 13/043* (2013.01);
(Continued)

(58) Field of Classification Search
CPC ......... G10L 15/00; G10L 15/22; G10L 15/26; G10L 15/265; G10L 15/30;
(Continued)

(56) References Cited

U.S. PATENT DOCUMENTS 8,068,604 B2 * 11/2011 Leeds ................. H04M 1/656
379/167.08
8,762,156 B2 *  6/2014 Chen ...................... G10L 15/26
704/10
(Continued)

FOREIGN PATENT DOCUMENTS

RU   2320082 C2   3/2008
RU   2352979 C2   4/2009
(Continued)

OTHER PUBLICATIONS

"OpenNET. Catalogue of documents/Section "Programming, languages"/Document title. Section 17. Date and time", Dec. 14, 2009, 15 sheets [online] [found on May 5, 2014], available in the Internet as URL: http://web.archive.org/web/20091214201915/http://www.opennet.ru/docs/RUS/glibc/glibc-17.html, p. 1.
(Continued)

*Primary Examiner* — Edgar Guerra-Erazo
(74) *Attorney, Agent, or Firm* — Middleton Reutlinger

(57) ABSTRACT

Disclosed is the technology for dynamic and intelligent generation of dialog recommendations for the users of chat information systems based on multiple criteria. An example method may include receiving a speech-based user input, recognizing at least a part of the speech-based user input to generate a recognized input, and providing at least one
(Continued)

response to the recognized input. The method may further include identifying at least one triggering event, generating at least one dialog recommendation based at least in part on the identification, and presenting the at least one dialog recommendation to a user via a user device.

23 Claims, 10 Drawing Sheets

(51) Int. Cl.
| | | |
|---|---|---|
| G10L 15/00 | (2013.01) | |
| G10L 21/00 | (2013.01) | |
| G10L 25/00 | (2013.01) | |
| G10L 15/22 | (2006.01) | |
| G06F 3/0484 | (2013.01) | |
| G10L 13/04 | (2013.01) | |
| G10L 15/32 | (2013.01) | |

(52) U.S. Cl.
CPC ........ *G10L 15/32* (2013.01); *G10L 2015/225* (2013.01); *G10L 2015/228* (2013.01)

(58) Field of Classification Search
CPC ... G10L 2015/223; G10L 17/22; G10L 13/00; G10L 13/043; G06F 3/167; G06F 3/04842
USPC .......... 704/9, 10, 235, 246, 270, 270.1, 275
See application file for complete search history.

(56) References Cited

U.S. PATENT DOCUMENTS

| | | |
|---|---|---|
| 2004/0243419 A1 | 12/2004 | Wang |
| 2005/0192741 A1 | 9/2005 | Nichols et al. |
| 2007/0294229 A1* | 12/2007 | Au .................... G06F 17/30864 |
| 2009/0093259 A1 | 4/2009 | Edge et al. |
| 2011/0231240 A1 | 9/2011 | Schoen et al. |
| 2011/0238409 A1 | 9/2011 | Larcheveque et al. |
| 2012/0191716 A1 | 7/2012 | Omoigui |
| 2013/0185074 A1* | 7/2013 | Gruber ................ G06F 17/3087 704/257 |
| 2013/0185081 A1* | 7/2013 | Cheyer ............... G06F 17/3087 704/275 |

FOREIGN PATENT DOCUMENTS

| | | |
|---|---|---|
| RU | 2370804 | 10/2009 |
| RU | 117210 U1 | 6/2012 |
| RU | 2472307 | 1/2013 |
| WO | WO2006071271 A2 | 7/2006 |
| WO | WO2009046362 A1 | 4/2009 |

OTHER PUBLICATIONS

"AutoSpy. System for multi-channel recording of telephone conversations. User's guide/Interface/Calendar of events (scheduler)", Mar. 18, 2013, 2 sheets [online] [found on May 5, 2014], available in the Internet as URL: http://web.archive.org/web/20130318093317/http://www.autospy.ru/rukovodstvo/interface/kalendar_sobytij_planirovwik/, first paragraph.

Rospatent, Office Action with translation for Russian Application No. 2015156735, 13 pages dated Mar 17, 2017.

Rospatent, Decision to Grant for Russian Application No. 2015156735, 18 pages dated Jul. 31, 2017.

* cited by examiner

GENERATING DIALOG RECOMMENDATIONS FOR CHAT INFORMATION SYSTEMS BASED ON USER INTERACTION AND ENVIRONMENTAL DATA

TECHNICAL FIELD

This disclosure relates generally to chat information systems and, more particularly, to the technology for intelligent and proactive generation of dialog recommendations to users of chat information systems based on multiple criteria as described herein.

DESCRIPTION OF RELATED ART

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

A chat information system (CIS) is a computer-based agent having a human-centric interface for accessing and managing information. Traditionally, a CIS may interact with users in natural language to simulate an intelligent conversation and provide personalized assistance to the users. For example, the users may ask the CIS questions such as "Where is the nearest hotel?" or "What is the current weather?" and receive corresponding answers. The users may also ask the CIS to perform certain functions including, for example, generating emails, making phone calls, searching information, acquiring data, re-addressing user requests, guiding user, providing notifications and reminders, and so forth. CIS and personal digital assistant systems are widely used and are of great help for users of computers and are especially helpful for holders of portable electronic devices such as smart phones, tablet computers, gaming consoles, and so forth.

The term "chat information system" may also be known as "spoken dialog system," "dialog system," "conversational agent," "chatter robot," "chatterbot," "chatbot," "chat agent," "digital personal assistant/agent," "automated online assistant," and so forth. All these terms are within the scope of the present disclosure and referred to as "chat information system" or "CIS" for simplicity.

Essentially, the CIS users may ask a great number of various questions and request a wide range of information related to global and local news, weather, email content, calendar appointments, scheduled events, and any other searchable content. The CIS may be helpful not only in accessing certain information, but also for generating content, scheduling events, writing emails, navigating, and much more. On the other hand, it is often difficult for the users to understand what kind of information may be requested via a CIS at a particular instant in time. For example, beginner users may not readily understand or know the principles of operation of the CIS application or its particular functionalities. The users may lack understanding that a number of CIS application features may be prolifically utilized in solving their day-to-day tasks and needs. Therefore, there is still a need for development of CIS and, in particular, there is a need for improvement of human-CIS interface.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure approaches provide for the technology of intelligent generation dialog recommendations for the users of CIS based on multiple criteria. This technology overcomes at least some drawbacks of the prior art systems and improves the user-CIS interface and overall user experience of using CIS.

According to an aspect of the present disclosure, a method is provided for delivering dialog recommendations in a CIS. An example method may include receiving, by a processor operatively coupled to a memory, a speech-based user input. The method may further include recognizing, by the processor, at least a part of the speech-based user input to generate a recognized input. The method may further include providing, by the processor, at least one response to the recognized input. The method may further include identifying, by the processor, at least one triggering event. The method may further include generating, by the processor, at least one dialog recommendation based at least in part on the identification. The method may further include presenting, by the processor, the at least one dialog recommendation to a user via a user device.

In certain embodiments, the identifying of the at least one triggering event may include recognizing, by the processor, one or more predetermined words in the recognized input. In certain embodiments, the identifying of the at least one triggering event may include recognizing, by the processor, a type of user-CIS dialog context. In certain embodiments, the identifying of the at least one triggering event may include recognizing, by the processor, one or more CIS operating modes never used by the user. In certain embodiments, the identifying of the at least one triggering event may include recognizing, by the processor, one or more CIS operating modes, which the user did not use over a predetermined period of time. In certain embodiments, the identifying of the at least one triggering event may include recognizing, by the processor, one or more events associated with at least one social networking or blogging site. In certain embodiments, the identifying of the at least one triggering event may include recognizing, by the processor, one or more electronically-triggered determinable events related to user activity, activity of user's peers or friends, or community activity. In certain embodiments, the identifying of the at least one triggering event may include recognizing, by the processor, one or more events related to reports, news feeds, alerts, information posts, alarms, and so forth not directly associated with the user.

In certain embodiments, the method may further include determining, by the processor, a current time associated with the user device, and the identifying of the at least one triggering event may be based at least in part on the current time. In certain embodiments, the identifying of the at least one triggering event may include recognizing, by the processor, one or more calendar events scheduled within a predetermined time period from the current time.

In certain embodiments, the method may further include determining, by the processor, a current geographical location associated with the user device, and the identifying of the at least one triggering event may be based at least in part on the current geographical location. In certain embodiments, the identifying of the at least one triggering event may include establishing, by the processor, a presence of the user device within a predetermined geographical area. In certain embodiments, the identifying of the at least one triggering event may include recognizing, by the processor, a presence of one or more peripheral electronic devices within a predetermined distance from the current geographical location associated with the user device.

In certain embodiments, the identifying of the at least one triggering event may include recognizing, by the processor, a presence of the user device within one or more wireless networks. In certain embodiments, the identifying of the at least one triggering event may include recognizing, by the processor, a behavior of user-CIS interaction of the user similar to the behavior associated with user-CIS interaction of at least one other user.

In certain embodiments, the method may further include receiving, by the processor, a second speech-based user input, and the second speech-based user input may be associated with the at least one dialog recommendation. The method may further include performing, by the processor, automatic speech recognition of at least a part of the second speech-based user input to generate a second recognized input. The method may further include providing, by the processor, a second response to the second recognized input.

In certain embodiments, the at least one dialog recommendation may be delivered to the user device as an actionable message. In certain embodiments, the method may further include receiving, by the processor, a user selection of the at least one dialog recommendation and generating, by the processor, a response to the user selection. In certain embodiments, the recognizing of the at least a part of the speech-based user input to generate a recognized input includes performing automatic speech recognition utilizing one or more speech recognizers. In various embodiments, the one or more speech recognizers may include one or more of the following: a pattern-based speech recognizer, a free-dictation recognizer, an address book based recognizer, and a dynamically created recognizer.

According to another aspect of the present disclosure, a CIS is provided. The CIS may include a speech recognition module configured to receive a speech-based user input and recognize at least a part of the speech-based user input and generate a recognized input. The CIS may further include a dialog manager configured to generate at least one response to the recognized input. The CIS may further include an event manager configured to identify at least one triggering event. The CIS may further include a recommendation manager configured to generate at least one dialog recommendation based at least in part on the identification of the at least one triggering event.

In various embodiments, the CIS may further include an output renderer configured to provide the least one response and the at least one dialog recommendation to a user via a user device. In certain embodiments, the output renderer may include a text-to-speech generator. In certain embodiments, the output renderer may be configured to provide the at least one response as an audio message. In certain embodiments, the output renderer may be configured to provide the at least one dialog recommendation as a text message or an image message. In certain embodiments, the speech recognition module may include a plurality of speech recognizers. In certain embodiments, at least one of the speech recognition module, the dialog manager, the event manager, and the recommendation manager may be a distributed computing module. In certain embodiments, one of the speech recognition module, the dialog manager, the event manager, and the recommendation manager may be a cloud computing module.

In further example embodiments of the present disclosure, the method steps are stored on a machine-readable medium comprising instructions, which when implemented by one or more processors perform the recited steps. In yet further example embodiments, hardware systems or devices can be adapted to perform the recited steps. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements and in which.

DETAILED DESCRIPTION

Figure 1:
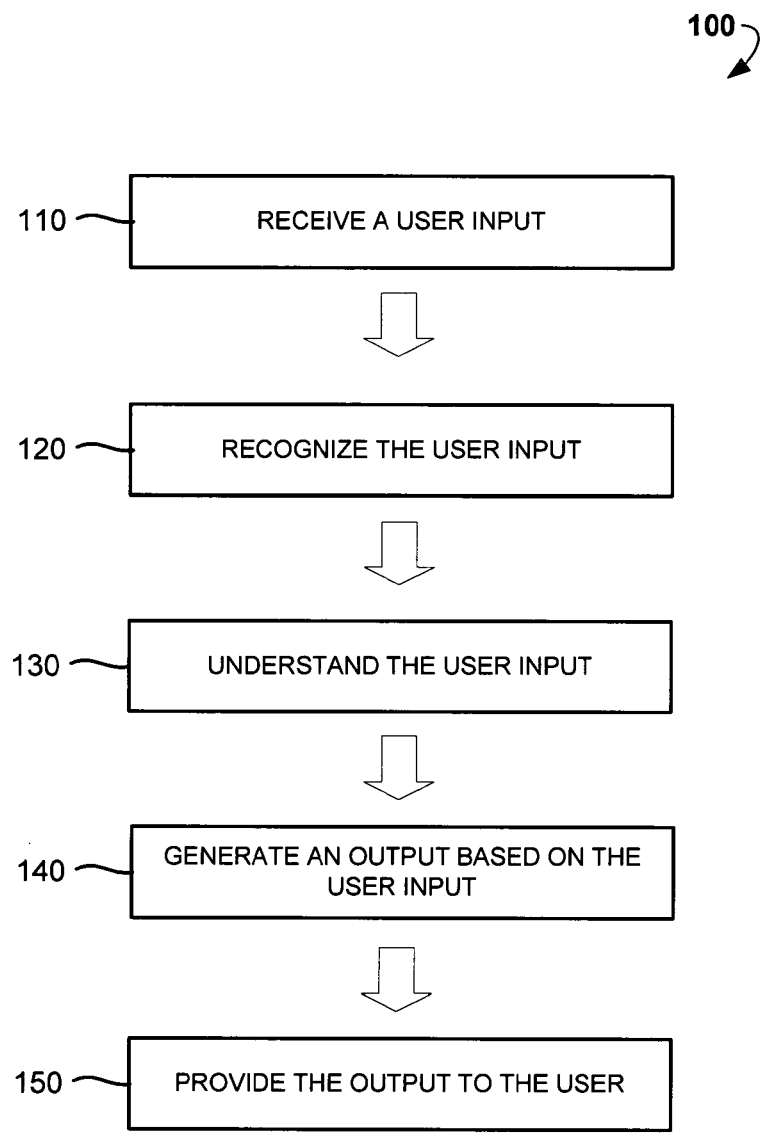
FIG. 1 is a high level flow diagram of user interaction with a CIS.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, tablet computer, laptop computer), game console, handheld gaming device, cellular phone, smart phone, smart television system, and so forth.

Introduction

The embodiments of the present disclosure refer to methods and corresponding systems for providing dialogue recommendations for users in CIS. In general, the dialog recommendations may be dynamically and proactively generated for attention of the users based on one or more criteria which are referred herein to as "triggering events." As described in greater details below, the CIS may monitor dialogue context, user interaction, current time and geographical location, presence of one or more specific devices within a predetermined area from the user, presence of certain wireless networks within a predetermined area from the user, scheduled events and appointments, social networking events, history of user-CIS interaction, various alerts, alarms, reports, news, posts, user-centered activities, not user-centered activities, and so forth. Based on the monitoring and identifying one or more triggering events, the CIS may intelligently generate one or more dialog recommendations and present them as text and/or image messages on a display of a user device. Essentially, the users may interact with the CIS utilizing speech commands, although key input commands or gesture-based commands are also possible. As described below in greater detail, the CIS may refer to a software application installed on a user device, a server, or a remote device, or it may refer to a distributed application. The user may interact with the CIS utilizing a user device selected from a wide range of electronic devices including, for example, a computer (desktop computer, laptop computer, tablet computer, personal digital assistant), smart phone, cellular phone, game console, game pad, remote controller, television device, smart (internet) television device, audio system, in-vehicle computer system, infotainment system, or any other suitable electronic device.

FIG. 1 shows a high level flow diagram 100 of user interaction with a CIS. As shown in this figure, the user may commence interaction at operation 110 with providing a speech-based (audio) user input via a user device (e.g., using one or more microphones). The user input may refer to an information request such as "What is the current weather?" or a speech command such as to send a text message or the like.

At operation 120, an automatic speech recognizer (ASR) of CIS may recognize the user input so as to translate spoken words, phrases, and sentences into text, which are referred to herein as a recognized input. The recognized input is then analyzed at operation 130 by a natural language processing (NLP) module (e.g., morphological analysis, part-of-speech tagging, or shallow parsing are performed). The NLP module may also map the recognized input or its parts to one or more meaning representations (e.g., semantic frame) from which the dialog act, user goal, and named entities are extracted by a semantic parser or statistical model.

At operation 140, a dialog manager generates an output (response) based at least in part on the recognized input and located meaning representations. For example, the dialog manager may retrieve specific information from one or more resources (e.g., electronic calendar, database, website, etc.). At operation 150, the output is provided to the user (for example, as a text, image, audio, or video message). For these ends, an output renderer may be utilized which may transform text into speech and provide the output as a machine-generated audio signal. Alternatively, the output may presented as a text message and shown on a display of the user device.

Figure 2:
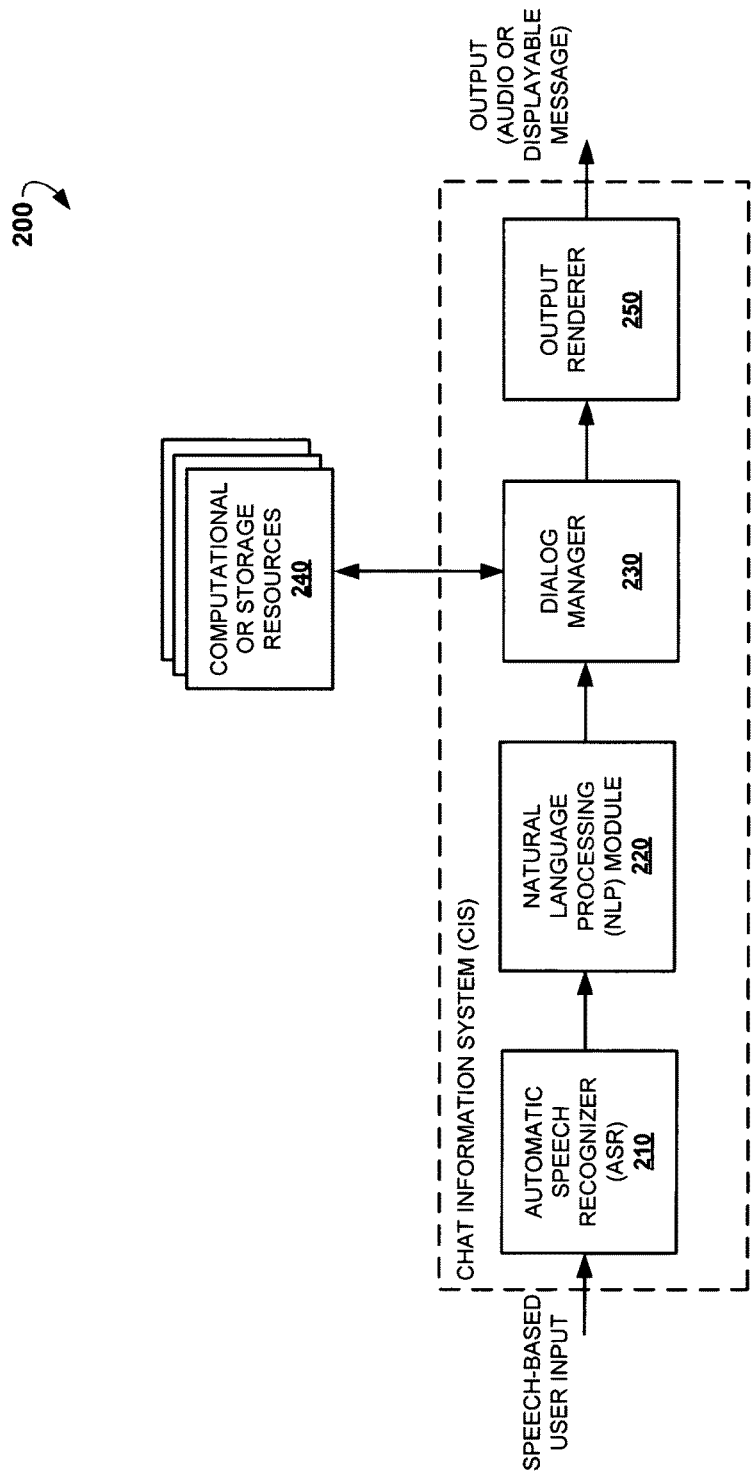
FIG. 2 is a high level architecture of a CIS, according to an example embodiment.

The above given user interaction is further illustrated in FIG. 2, which shows a high level architecture of CIS 200, according to an example embodiment. It should be noted that every module of CIS 200 may include hardware components, software components, or a combination thereof. The CIS 200 may be embedded in the user device or server, or may be presented as a cloud computing module and/or a distributed computing module.

The CIS 200 may include an ASR 210 configured to receive and process speech-based user inputs into a sequence of parameter vectors. The ASR 210 further converts the sequence of parameter vectors into a recognized input (i.e., a textual input having one or more words, phrases, or sentences). The ASR 210 may include one or more speech recognizers such as a pattern-based speech recognizer, free-dictation recognizer, address book based recognizer, dynamically created recognizer, and so forth.

Further, the CIS 200 may include a NLP module 220 for understanding spoken language input. Specifically, the NLP module 220 may disassemble and parse the recognized input to produce utterances which are then analyzed utilizing, for example, morphological analysis, part-of-speech tagging, shallow parsing, and the like, and then map recognized input or its parts to meaning representations.

The CIS 200 may further include a dialog manager 230, which is an important part of the CIS 200 because it coordinates the activity of all components, controls dialog flows, and communicates with external applications/devices. The dialog manager 230 may play many roles, which include discourse analysis, context analysis, knowledge database query, and system action prediction based on the discourse context. In some embodiments, the dialog manager 230 may contact one or more task managers (not shown) that may have knowledge of specific task domains. In some embodiments, the dialog manager 230 may communicate with various computing, logic, or storage resources 240, which may include, for example, a triggering data database, rules database, electronic address book, email or text agents, dialog history database, various knowledge databases, map database, points of interest database, geographical location determiner, clock, wireless network detector, search engines, social networking websites, blogging websites, and so forth. The dialog manager 230 may employ multiple various approaches to generate output in response to the recognized input. Some approaches may include the use of statistical analysis, machine-learning algorithms (e.g., neural networks), heuristic analysis, and so forth. The dialog manager 230 is one of the central components of CIS 200. The major role of the dialog manager 230 is to select the correct system actions based on observed evidences and inferred dialog states from the results of NLP (e.g., dialog act, user goal, and discourse history). In addition, the dialog manager 230 should be able to handle errors when the user input has ASR and NLP errors caused by noises or unexpected inputs.

The CIS 200 may further include an output renderer 250 for transforming the output of the dialog manager 230 into a form suitable for providing to the user. For example, the output renderer 250 may employ a text-to-speech engine or may contact a prerecorded audio database to generate an audio message corresponding to the output of the dialog manager 230. In certain embodiments, the output renderer 250 may present the output of the dialog manager 230 as a text message, an image, or a video message for further displaying on a display screen of the user device.

System Architecture

Figure 3:
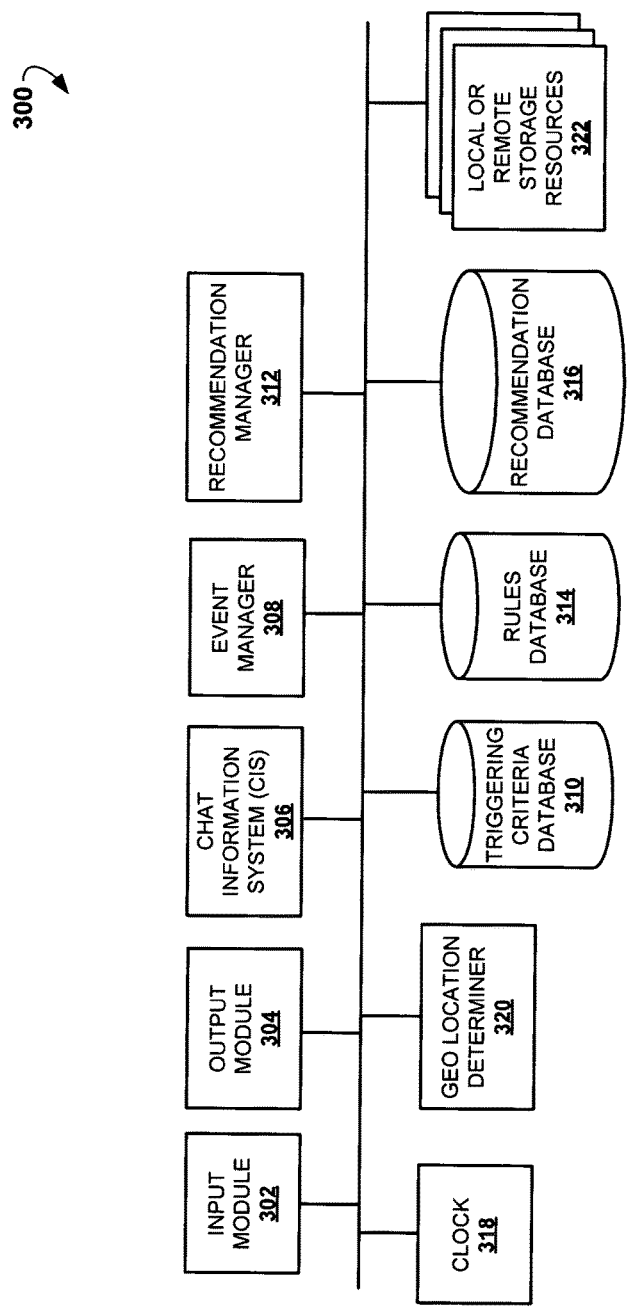
FIG. 3 is a high-level block diagram of an example system suitable for practicing the present technologies for delivering dialog recommendations.

FIG. 3 shows a high-level block diagram of an example system 300 suitable for practicing the present technologies for delivering dialog recommendations. It should be understood by those skilled in the art that all components of the system 300 may include logic elements, hardware components, software (firmware) components, or a combination thereof. The modules of system 300 may be present in one device (e.g., a user device), multiple devices (e.g., in client-server environment), or may be distributed computing modules or cloud computing modules. Further, all modules shown in FIG. 3 may be operatively coupled using any suitable wired, wireless, radio, or optical standards.

As shown in FIG. 3, the system 300 may include one or more input modules 302 such as a microphone, touchscreen, keypad, keyboard, touchpad, trackball, video camera (for gesture recognition), and the like. The system 300 may also include one or more output modules 304 such as speakers or a display.

The system 300 further includes a CIS 306 for providing a human-centric interface for accessing and managing information as discussed above. The CIS 306 may be represented by an example implementation shown above with reference to FIG. 2.

The system 300 further includes an event manager 308 for monitoring activities and identifying one or more trigger events. The trigger events may relate to a wide range of various activities or events. Some examples of trigger events may include:

- identifying one or more predetermined words, phrases, or sentences in identifying input processed by the CIS 306;
- identifying a type of user-CIS dialog context;
- identifying those CIS operating modes, functions, or features never used by the user;
- identifying those CIS operating modes, functions, or features that the user has not used over a predetermined period of time;
- identifying events associated with social networking or blogging sites (e.g., a new friend's post, friend's event, new friend's status);
- identifying a current time/date and determining that one or more scheduled events are scheduled at this time or at a predetermined time period from the current time/date;
- identifying a current geographical location of the user device and determining that one or more scheduled events are scheduled at this location or within a predetermined area associated with this location;
- identifying that one or more predetermined networked (peripheral) devices are located within a predetermined area (distance) from the current location of the user device;
- identifying that the user device is within one or more predetermined wireless networks;
- identifying that user-CIS interaction context or behavior is similar to one or more prerecorded or predetermined user-CIS interaction contexts or behaviors associated with other users; and so forth.

The event manager 308 may refer to a triggering criteria database 310, which may store various criteria, rules, reference triggering events, and so forth. For example, the triggering criteria database 310 may store a list of triggering words (e.g., "weather," "email," "where," "schedule," "when," etc.), a list of predetermined geographical locations, a list of wireless networks, a list of peripheral devices, a list of user-CIS interaction types, dialog histories, and many other rules or criteria.

The system 300 may include a recommendation manager 312 for generating dialog recommendations for the user based at least in part on triggering events identified by the event manager 308, rules stored in rule database 314 and/or recommendation templates stored in a recommendation database 316. More specifically, once the event manager 308 identifies a specific triggering event, the recommendation manager 312 refers to the rule database 314 and/or recommendation database 316 to locate data and/rules associated with the identified triggering event. Based on the located data/rule and the triggering event itself, the recommendation manager 312 produces one or more dialog recommendations for the user, which may be then presented to the user via the output module 304 (e.g., the recommendation may be displayed). For example, when the event manager 308 identifies that the triggering event refers to the user inquiry "What is the current weather?," the recommendation manager 312 may generate dialog recommendations to offer to the user to ask what will the weather be tomorrow, the day after tomorrow, in a neighboring city, or in a city where the user frequently travels. In an example, when the event manager 308 identifies that the triggering event refers to accessing the digital calendar and locating specific scheduled events, the recommendation manager 312 may generate dialog recommendations for the user to prompt him to ask to set reminders, invite attendees for the scheduled event, navigate him to the location of the scheduled event, and so forth. In yet another example, the triggering event may refer merely to the case when the user never used specific CIS features such as navigation, reminders, daily brief applications, and the like, and the recommendation manager 312 may generate dialog recommendations for the user to prompt him to start using these features. Some other examples are given below.

Still referring to FIG. 3, the system 300 may include a clock 318 for providing current time or current time and date for the requesting module. The clock 318 may be either internal or remote module. The system 300 may further include a geo location determiner 320 for determining a current geographical location of the user device. The geo location determiner 320 may utilize a number of different methods for determining geographical location including, for example, receiving and processing signals of Global Positioning Systems (GPS), GLONASS satellite navigation systems, or Galileo satellite navigation system; utilizing multilateration of radio signals between radio towers (base stations); or utilizing geolocation methods associated with Internet Protocol (IP) addresses, Media Access Control (MAC) addresses, Radio-Frequency Identification (RFID), or other technologies.

The system 300 may include one or more local or remote storage or computing resources 322 including, for example, web resources, web sites, social networking websites, blogging websites, news feeds, email servers, web calendars, event databases, ticket aggregators, map databases, points of interest databases, and so forth. It should be clear that the event manager 308 and the recommendation manager 312 may also refer to these resources 322 for identifying triggering events or producing dialog recommendations.

Still referring to FIG. 3, the CIS 306 may have various user-CIS conversation types (one may consider those as operating modes). More specifically, user-CIS conversation types may include one or more of the following: a basic conversation type to deliver responses to general user inquiries, a news delivery conversation type, a navigation conversation type, a daily digest conversation type, an e-mail monitoring conversation type, an email/text preparing conversation type, a social network monitoring conversation type, a blog monitoring conversation type, a calendar events monitoring conversation type, a location based suggestion conversation type, an Internet search mode, a weather monitoring conversation type, and so forth. Accordingly, the event manager 308 may monitor whether or not all of these modes have been used or tried by a user (especially a beginner user).

Figure 4:
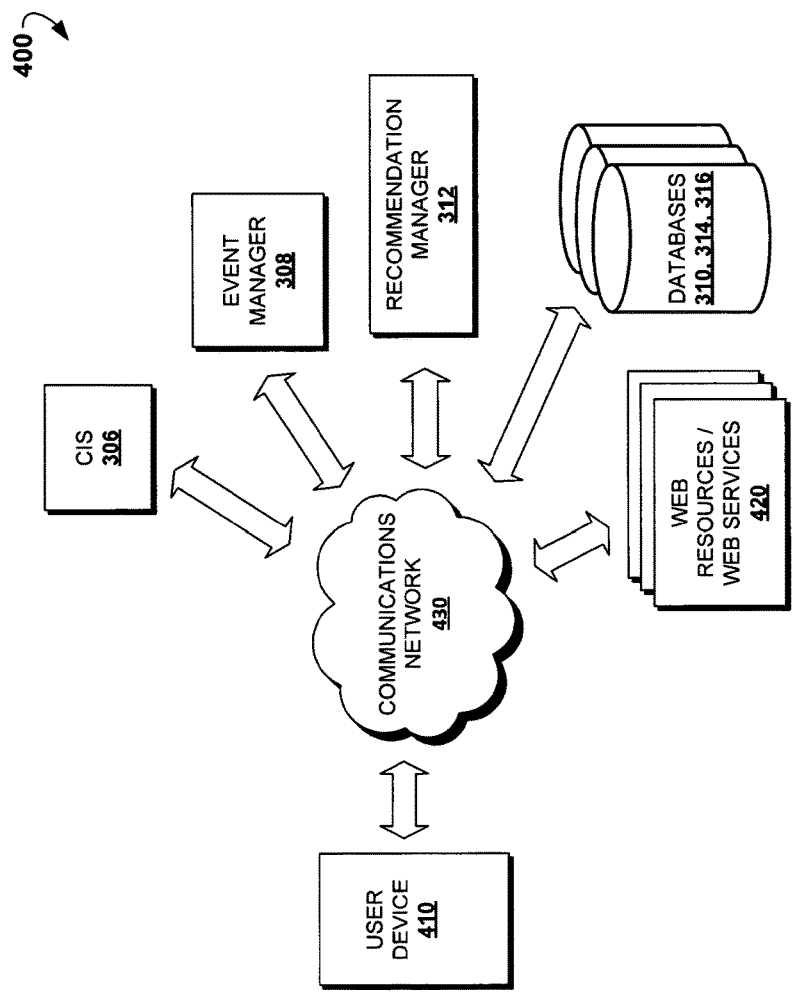
FIG. 4 is a high-level block diagram of an example system environment suitable for practicing the present technologies for dynamic generation of dialog recommendations.

FIG. 4 shows a high-level block diagram of an example system environment 400 suitable for practicing the present technologies for dynamic generation of dialog recommendations. The system environment 400 may include a user device 410, distributed modules including a CIS 306, an event manager 308, a recommendation manager 312, one or more databases (e.g., a triggering criteria database 310, rules database 314, recommendation database 316), one or more web resources and/or one or more web services 420, and a communications network 430.

According to various embodiments, the user device 410 may refer to a client in a "client-server environment." In general, the user device 410 may include a computer (e.g., a desktop computer, laptop computer, tablet computer), smart phone, wireless telephone, cellular phone, television system, gaming console, gaming pad, in-vehicle computer, infotainment system, smart-home computer, and any other electronic device having at least one processing or computational unit. The user device 410 should be configured to receive or capture user audio inputs (e.g., via one or more microphones). Furthermore, the user device 410 may run dedicated software allowing it to practice the principles of the present disclosure. In an example, the user device 410 may run a browser allowing the user to visit a dedicated webpage which employs at least some functionality of the CIS 306 and other modules. In another example, the user device 410 may run a dedicated mobile application enabling communication with the CIS 306 and other modules. It should be understood that the CIS 306, event manager 308, recommendation manager 312 and/or other modules or databases may be run on the user device 410 or a networked server, or, they may constitute distributed software application(s) running on both the user device 410 and a network server (not shown) or on a plurality of networked servers (e.g., be cloud-based embodiment).

The communications network 430 can be a wireless or wire network, or a combination thereof. For example, the network may include one or more of the following: the Internet, local intranet, PAN (Personal Area Network), LAN (Local Area Network), WAN (Wide Area Network), MAN (Metropolitan Area Network), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, DSL (Digital Subscriber Line) connection, Ethernet connection, ISDN (Integrated Services Digital Network) line, cable modem, ATM (Asynchronous Transfer Mode) connection, or an FDDI (Fiber Distributed Data Interface) or CDDI (Copper Distributed Data Interface) connection. Furthermore, communications may also include links to any of a variety of wireless networks including, GPRS (General Packet Radio Service), GSM (Global System for Mobile Communication), CDMA (Code Division Multiple Access) or TDMA (Time Division Multiple Access), cellular phone networks, GPS, CDPD (cellular digital packet data), RIM (Research in Motion, Limited) duplex paging network, Bluetooth radio, or an IEEE 802.11-based radio frequency network.

In various embodiments, the one or more web resources and/or one or more web services 420 may include one or more of the following: webpages, websites, Internet search engines, databases, data storage, data aggregators (e.g., ticket aggregators), file sharing websites, e-mail servers, e-mail services, instant messaging services, social networking websites, blogging websites, micro-blogging websites, news services, news Rich Site Summaries (RSS), map services, online banking services, online calendar services, online appointment scheduling services, location determining services, weather services, time services, Application Programming Interfaces (APIs), and so forth. The CIS 306, event manager 308, recommendation manager 312, and the user device 410 may be configured to operatively communicate with these or similar web resources/services 420 to exchange data depending on an application. For example, the CIS 306 may communicate with the at least one web resource/service 420 so as to generate responses to user inputs (e.g., to retrieve/download weather information). In an another example, the event manager 308 may communicate with the at least one web resource/service 420 so as to identify triggering events (e.g., identifying a new status of the user's friend via at least one social networking site). In yet another embodiment, the recommendation manager 312 may communicate with the at least one web resource/service 420 so as to generate one or more dialog recommendations for the user (e.g., communicating with a map service to identify points of interests located near a current location of the user).

Figure 5:
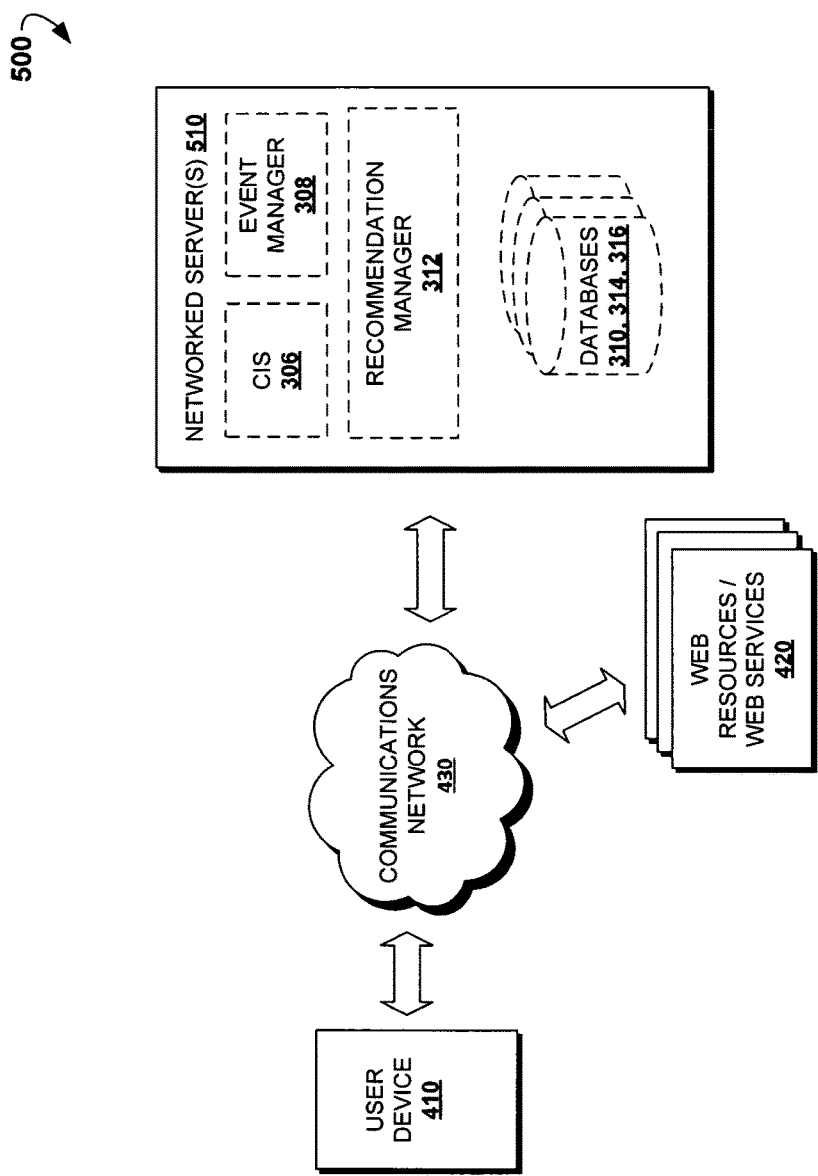
FIG. 5 is a high-level block diagram of another example system environment suitable for practicing the present technologies for dynamic generation of dialog recommendations.

FIG. 5 shows a high-level block diagram of another example system environment 500 suitable for practicing the present technologies for dynamic generation of dialog recommendations. In particular, in this embodiment, the CIS 306, event manager 308, recommendation manager 312 and/or a plurality of databases 310, 314, 316 may reside in one or more networked servers 510. It should also be clear that these modules may run in a plurality of networked servers or within a computing cloud.

Figure 6:
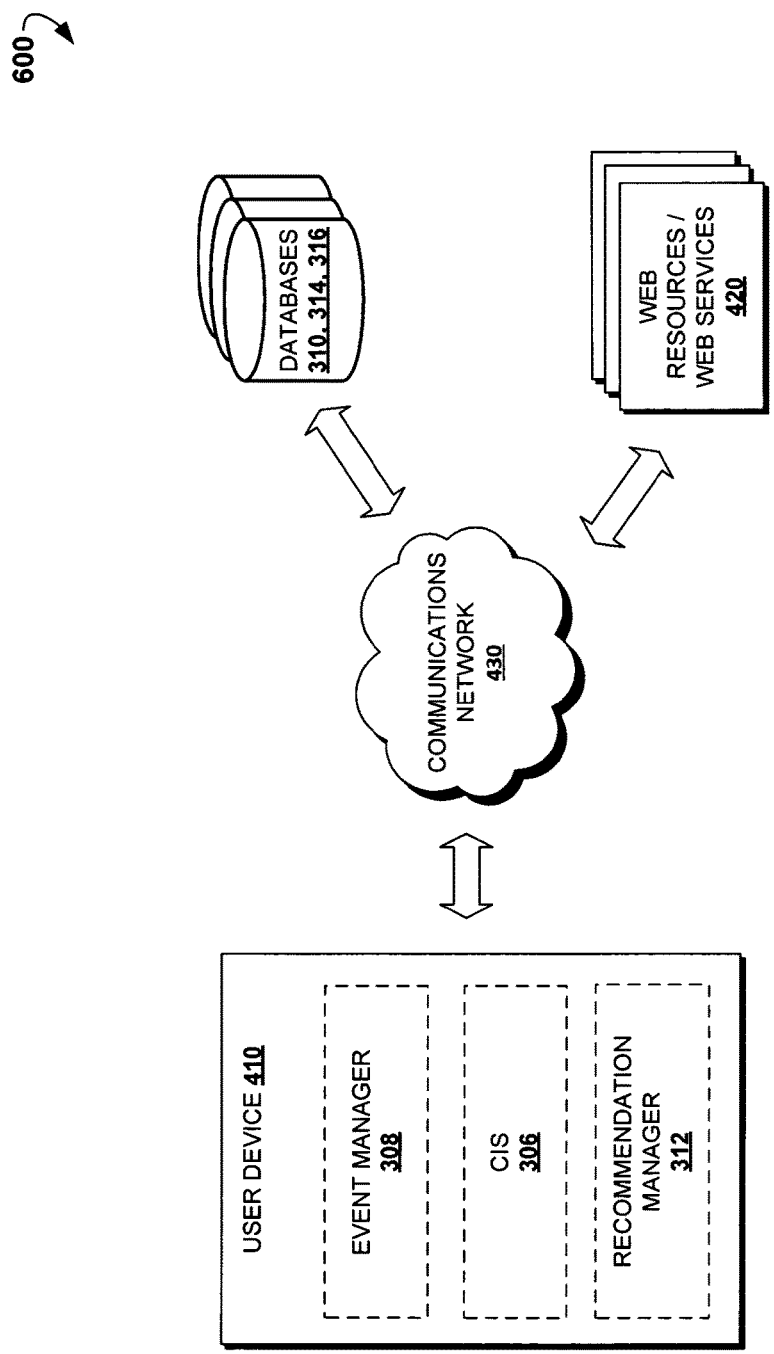
FIG. 6 is a high-level block diagram of yet another example system environment suitable for practicing the present technologies.

FIG. 6 shows a high-level block diagram of yet another example system environment 600 suitable for practicing the present technologies. In particular, in this embodiment, the CIS 306, event manager 308, recommendation manager 312 and optionally a plurality of databases 310, 314, 316 may reside in the user device 410.

Graphical User Interface

Figure 7:
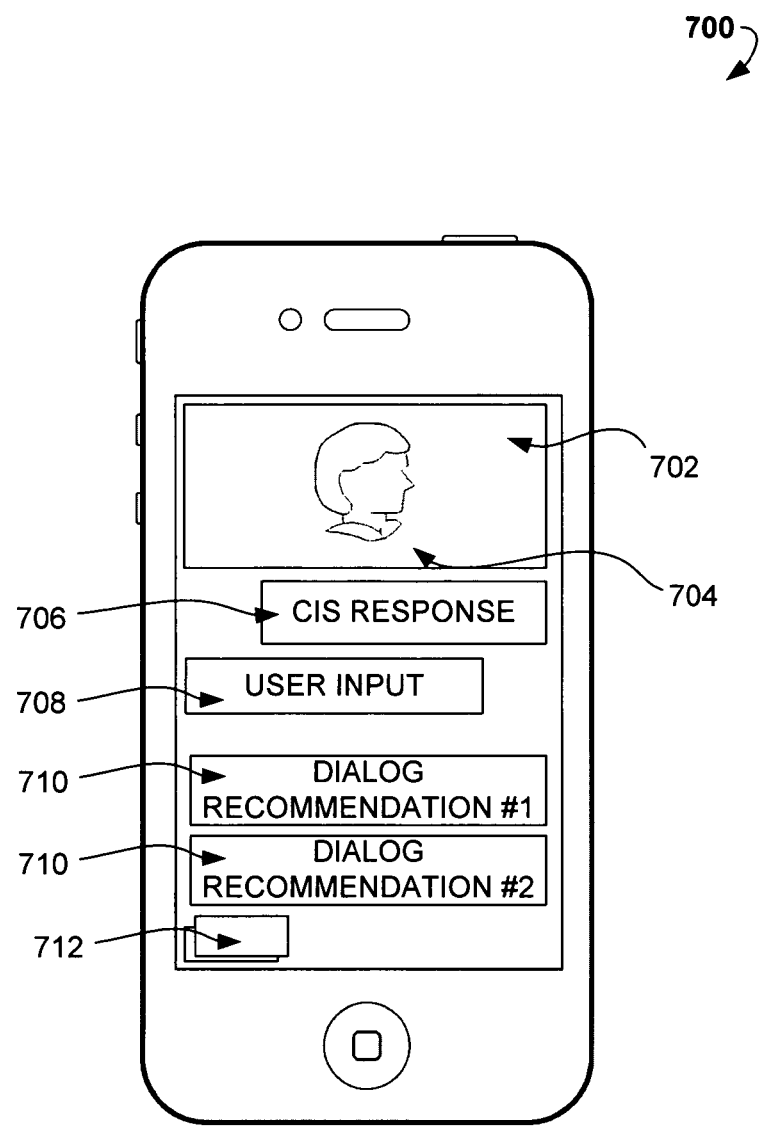
FIG. 7 is a schematic diagram of a graphical user interface with chat features for a user device, in accordance with an example embodiment.

FIG. 7 illustrates a schematic diagram of a graphical user interface 700 with chat features for a user device 410, in accordance with an example embodiment. Although the user device 410 is a smartphone in the example shown, the same or similar graphical user interface 700 may be provided for a desktop or laptop computer, tablet computer, or any other suitable device. In the example shown, the user device 410 includes a touchscreen which displays the user interface 700. In the example embodiment, the user interface 700 includes a tray (output box) 702 where an avatar 704 is displayed. Optionally, the user can select a different avatar, or construct it from various elements (e.g., select clothes, eyes, hair, etc.). Optionally, multiple trays for multiple topics can be employed. The user interface 700 also includes a tray 706 for displaying a message (text, image, or video) generated by the system (i.e., a CIS response). The user interface 700 may also include a tray 708 for displaying user input (e.g., a recognized audio input or manual text input). The user interface 700 also includes a tray 710 for displaying one or more dialog recommendations generated by the recommendation manager 312. The dialog recommendations may be presented as a text, image, video, or a combination thereof. Furthermore, the dialog recommendations may be displayed in separate actionable messages (buttons) or hyperlinks. The user may have an option to click or select one of the displayed dialog recommendations, which would be equivalent to spoken dialog recommendations. It should be also understood that the user may speak dialog recommendations and the CIS will provide a corresponding response.

According to certain embodiments, the user may interact with the user interface 700 by making a contact or by touching the trays. The user interface 700 may also include one or more control buttons 712. The control buttons 712 may be used for selecting or changing specific settings, displaying characteristics, or controlling other options. The contact can be a gesture, such as, for example, one or more taps or one or more swipes (from left to right, from right to left, upward and/or downward). Thus, the user may activate or interact with the user interface 700 by making touch gestures (any suitable touches or swipes).

In certain embodiments, the user may activate or interact with the user interface 700 by actuating traditional buttons present on the user device (e.g., "main menu" button or a key pad). In yet other embodiments, the user may activate or interact with the user interface 700 by giving a voice or text command. In yet other embodiments, the user interface 700 may be activated and present to the user automatically by an external command, e.g. from a remote server.

Example Operation Methods

Figure 8:
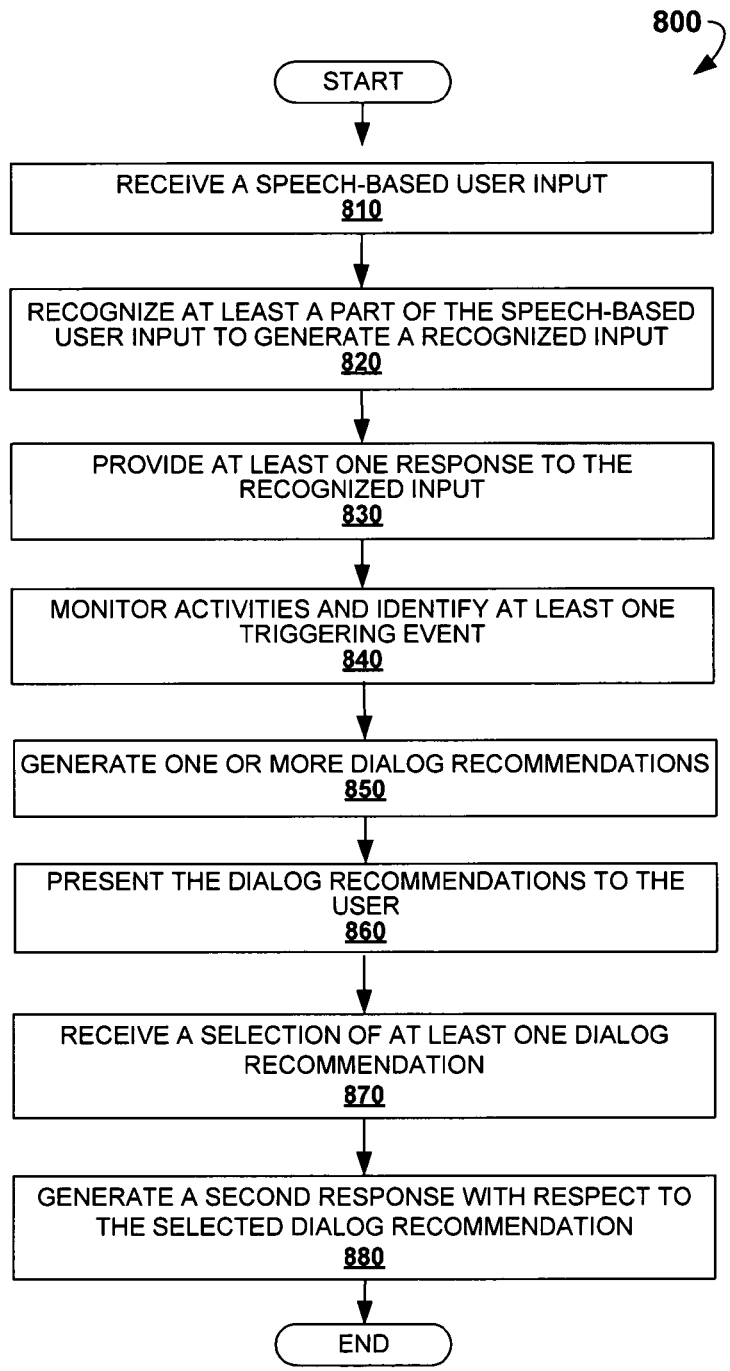
FIG. 8 is a process flow diagram showing a method for delivering dialog recommendations in a CIS, according to an example embodiment.

FIG. 8 is a process flow diagram showing a method 800 for delivering dialog recommendations in a CIS, according to an example embodiment. The method 800 may be performed by processing logic that may comprise hardware (e.g., decision making logic, dedicated logic, programmable logic, and microcode), software (such as software run on a general-purpose computer system or a dedicated machine), or a combination of both. In one example embodiment, the processing logic resides at the CIS 306, event manager 308 and/or the recommendation manager 312. In other words, the method 800 can be performed by various components discussed above with reference to FIGS. 2-6.

As shown in FIG. 8, the method 800 may commence at operation 810 with the CIS 306 receiving a speech-based (audio) input from a user. The user input may be made, for example, via a microphone of the user device 410. At operation 820, the CIS 306 recognizes at least a part of the user input and generates a recognized input.

At operation 830, the CIS 306 generates at least one response to the recognized input and provides it to the user as a machine generated audio message and/or displayable text, image, or video message. The output renderer 250 may be utilized for these actions.

At operation 840, the event manager 308 may constantly monitor the user activity and/or environmental data (i.e., "external events") and identify at least one triggering event. Triggering events may refer to a wide range of various activities or events such as predetermined words, phrases or sentences; predetermined types of user-CIS dialog contexts; operating modes, functions, or features never used by the user; operating modes, functions, or features that the user has not used over a predetermined period of time; predetermined events associated with social networking or blogging sites; scheduled events; presence in predetermined geographical location or area; presence of one or more predetermined networked (peripheral) devices within a predetermined area from the user; presence within one or more predetermined wireless networks; predetermined user-CIS interaction context or behavior; similarity to one or more prerecorded or predetermined user-CIS interaction contexts or behaviors associated with another users; and so forth. The event manager 308 may communicate with the triggering criteria database 310, which may store specific criteria or rules needed for identifying triggering events.

At operation 850, the recommendation manager 312 generates one or more dialog recommendations based on the triggering events identified at operation 840. The dialog recommendations may also refer to a wide range of text, image, audio, or video messages including, for example, recommendations or suggestions for the user as to how to continue or proceed with the dialog with CIS. In some example embodiments, the dialog recommendations may include, for example, suggestions as to what questions the user may ask, what CIS operating modes or features the user may active, what information the user may get from the CIS, and so forth.

At operation 860, the recommendation manager 312 or the output renderer 250 of the CIS 306 presents the one or more dialog recommendations to the user as actionable messages on a display screen of the user device 410.

At operation 870, the user may select (click) one of the shown dialog recommendations and, accordingly, the CIS 306 may receive a new input associated to the selected dialog recommendation. Since this input is already given in machine-readable format, there is no need to perform speech recognition of this input, and the CIS 306 may proceed with its analysis as discussed above.

At operation 880, the CIS 308 may generate a second response to the user, and the output renderer 250 may display it and/or generate a corresponding audio output for the user. The second response should address the selected dialog recommendation.

In an example implementation, the user may have scheduled a trip from one location to another and may have this information in his digital calendar stored in the user device 410. Once the user arrives to the new location, the user may utilize the CIS 306 to learn more about where he may rent a car. The CIS may process this user request as described above and provide a corresponding response. At the same time, the event manager 308 may determine a current location of the user and also that in certain similar user-CIS interaction cases, other users were interested to learn the locations of good restaurants. Accordingly, one or more triggering events can be determined by the event manager 308, which are then used by the recommendation manager 312 so as to generate a set of dialog recommendations for the user such as "Where are restaurants in this area?," "Please navigate me to the nearest hotel," "What are today's night club events?," and so forth. Further, the user may select, for example, the "Where are restaurants in this area?" dialog recommendation, and the CIS 306 may refer to a map application or any other suitable web service to show nearby restaurants, today's deals, ads, directions, and so forth. It should be understood that the recommendation manager 312 may intelligently generate dialog recommendations based at least on user profile (e.g., which may be stored in a social networking website). In this case, the recommendation manager 312 may know, for example, the user's age and decide what may be interesting for people in specific age category. Those skilled in the art should understand that multiple various criteria and rules may be applied to the generation of dialog recommendations.

In another example implementation, the user may utilize the CIS 306 to generate an email to invite friends to a party. The CIS may process this user request as described above and provide a corresponding response by generating and sending an email. At the same time, the event manager 308 may determine a triggering event, which referred to the word or action associated with scheduling events. In this regard, the recommendation manager 312 may generate a set of dialog recommendations for the user such as "Schedule an event in my calendar," "Invite my friends via a social networking website," "Where are party supplies stores?," and so forth. Further, the user may select, for example, the "Invite my friends via a social networking website" dialog recommendation, and the CIS 306 may refer to an API of a corresponding social networking web service to schedule an event.

Figure 9:
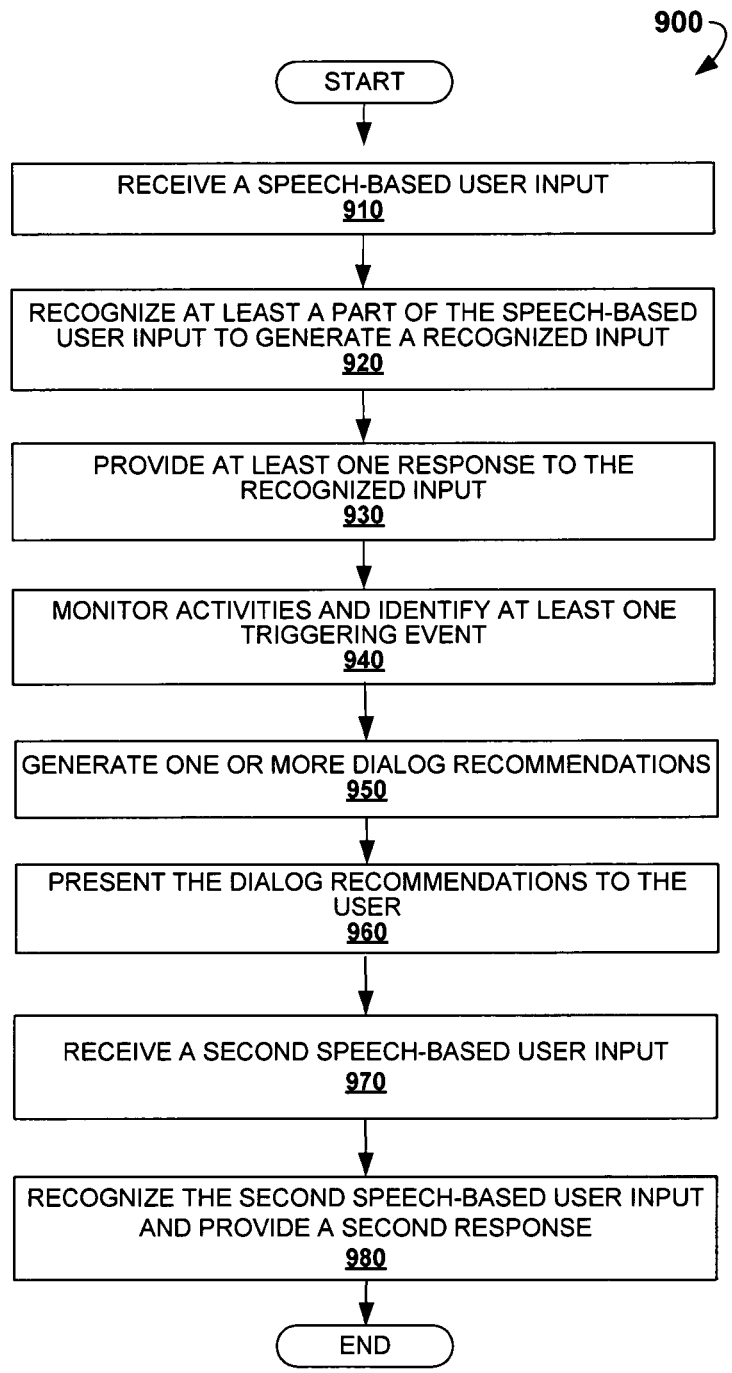
FIG. 9 is a process flow diagram showing a method for delivering dialog recommendations in a CIS, according to another example embodiment.

FIG. 9 is a process flow diagram showing a method 900 for delivering dialog recommendations in a CIS, according to another example embodiment. The method 900 may be performed by processing logic that may comprise hardware (e.g., decision making logic, dedicated logic, programmable logic, and microcode), software (such as software run on a general-purpose computer system or a dedicated machine), or a combination of both. In one example embodiment, the processing logic resides at the CIS 306, event manager 308 and/or the recommendation manager 312. In other words, the method 900 can be performed by various components discussed above with reference to FIGS. 2-6.

As shown in FIG. 9, the method 900 may commence at operation 910 with the CIS 306 receiving a speech-based input from a user. At operation 920, the CIS 306 recognizes at least a part of the user input and generates a recognized input. At operation 930, the CIS 306 generates at least one response to the recognized input and provides it to the user as a machine generated audio message and/or displayable text, image, or video message. At operation 940, the event manager 308 may identify at least one triggering event. At operation 950, the recommendation manager 312 generates one or more dialog recommendations based on the triggering events identified at operation 940. At operation 960, the recommendation manager 312 or the output renderer 250 of the CIS 306 presents the one or more dialog recommendations to the user as displayable messages on a display screen of the user device 410. At operation 970, the user speaks at least one of the dialog recommendations and, accordingly, the CIS 306 may receive a new speech-based input associated. At operation 980, the CIS 306 may process the new speech-based input (i.e., perform speech recognition as discussed above), create a corresponding recognized input, and generate a second response to the user and provide it to the user as discussed above.

Example Computing Environment

Figure 10:
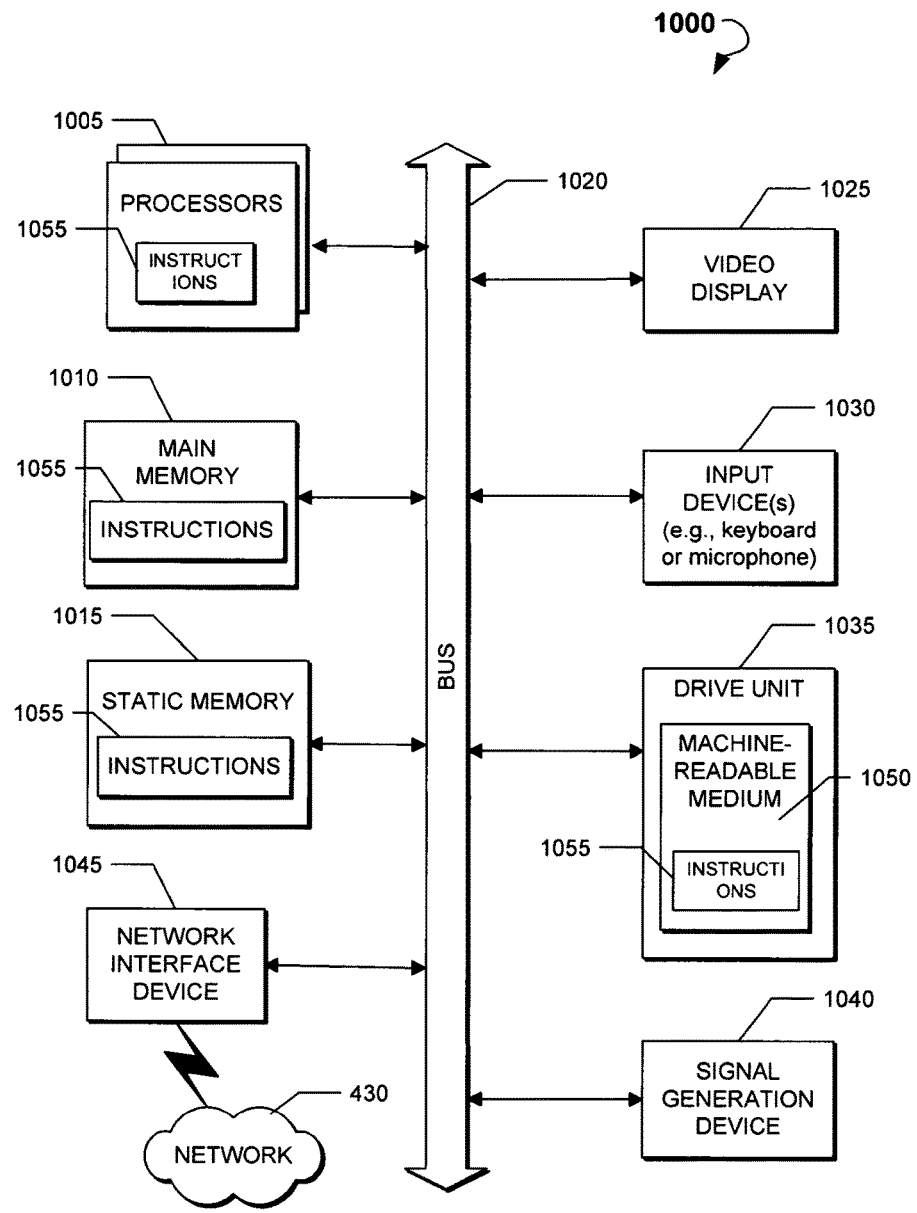
FIG. 10 shows a diagrammatic representation of a computing device for a machine in the example electronic form of a computer system, within which a set of instructions for causing the machine to perform any one or more of the methodologies discussed herein can be executed.

FIG. 10 shows a diagrammatic representation of a computing device for a machine in the example electronic form of a computer system 1000, within which a set of instructions for causing the machine to perform any one or more of the methodologies discussed herein can be executed. In various example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a personal digital assistant, a cellular telephone, a portable music player (e.g., a portable hard drive audio device, such as an Moving Picture Experts Group Audio Layer 3 (MP3) player), gaming pad, portable gaming console, in-vehicle computer, smart-home computer, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor or multiple processors 1005 (e.g., a central processing unit (CPU), a graphics processing unit (GPU), or both), and a main memory 1010 and a static memory 1015, which communicate with each other via a bus 1020. The computer system 1000 can further include a video display unit 1025 (e.g., a liquid crystal display (LCD) or a cathode ray tube (CRT)). The computer system 1000 also includes at least one input device 1030, such as an alphanumeric input device (e.g., a keyboard), a cursor control device (e.g., a mouse), a microphone, a digital camera, a video camera, and so forth. The computer system 1000 also includes a disk drive unit 1035, a signal generation device 1040 (e.g., a speaker), and a network interface device 1045.

The disk drive unit 1035 includes a computer-readable medium 1050, which stores one or more sets of instructions and data structures (e.g., instructions 1055) embodying or utilized by any one or more of the methodologies or functions described herein. The instructions 1055 can also reside, completely or at least partially, within the main memory 1010 and/or within the processors 1005 during execution thereof by the computer system 1000. The main memory 1010 and the processors 1005 also constitute machine-readable media.

The instructions 1055 can further be transmitted or received over the network 430 via the network interface device 1045 utilizing any one of a number of well-known transfer protocols (e.g., Hyper Text Transfer Protocol (HTTP), CAN, Serial, and Modbus).

While the computer-readable medium 1050 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks (DVDs), random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Thus, methods and systems for dynamic and intelligent generation of dialog recommendations are disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

The invention claimed is:

1. A method for delivering dialog recommendations in a hardware-based chat information system (CIS), the method comprising:
   receiving, by a processor operatively coupled to a memory, a speech-based user input;
   recognizing, by the processor, at least a part of the speech-based user input to generate a recognized input;
   providing, by the processor, at least one response to the recognized input, the at least one response provided for presentation via a user device in response to the speech-based user input;
   monitoring, by the processor, for occurrence of at least one triggering event;
   identifying, by the processor and based on the monitoring, the occurrence of the at least one triggering event, wherein identifying the occurrence of the at least one triggering event comprises recognizing one or more CIS operating modes, based on at least one of:
      the one or more CIS operating modes having never been used by the user, and
      the one or more CIS operating modes having not been used by the user over a predetermined period of time;
   based at least in part on the identification, generating, by the processor, at least one dialog recommendation that is related to the at least one triggering event;
   presenting, by the processor, the at least one dialog recommendation to a user via the user device, wherein the at least one dialog recommendation is presented via the user device separate from the at least one response;
   receiving, by the processor after the presenting, either a selection of the dialog recommendation or a second speech-based user input that is based on a user speaking the at least one dialog recommendation; and
   providing, by the processor, a corresponding response in response to the receiving, wherein the corresponding response corresponds to the at least one dialog recommendation, and wherein the corresponding response is provided when either of the selection or the second speech-based user input is received.

2. The method of claim 1, wherein the identifying of the at least one triggering event further includes recognizing, by the processor, one or more predetermined words in the recognized input.

3. The method of claim 1, wherein the identifying of the at least one triggering event further includes recognizing, by the processor, a type of user-CIS dialog context.

4. The method of claim 1, wherein the identifying of the at least one triggering event further includes recognizing, by the processor and based on the monitoring, one or more events associated with at least one social networking or blogging site.

5. The method of claim 1, further comprising:
   determining, by the processor, a current time associated with the user device; and
   wherein the identifying of the at least one triggering event is further based at least in part on the current time.

6. The method of claim 5, wherein the identifying of the at least one triggering event includes recognizing, by the processor and based on the monitoring, one or more calendar events scheduled within a predetermined time period from the current time.

7. The method of claim 1, further comprising:
   determining, by the processor, a current geographical location associated with the user device; and
   wherein the identifying of the at least one triggering event is further based at least in part on the current geographical location.

8. The method of claim 7, wherein the identifying of the at least one triggering event further includes establishing, by the processor and based on the monitoring, presence of the user device within a predetermined geographical area.

9. The method of claim 7, wherein the identifying of the at least one triggering event further includes recognizing, by the processor and based on the monitoring, presence of one or more peripheral electronic devices within a predetermined distance from the current geographical location associated with the user device.

10. The method of claim 1, wherein the identifying of the at least one triggering event further includes recognizing, by the processor and based on the monitoring, presence of the user device within one or more wireless networks.

11. The method of claim 1, wherein the identifying of the at least one triggering event further includes recognizing, by the processor and based on the monitoring, behavior similar to user-CIS interactions associated with at least one another user.

12. The method of claim 1, further comprising:
   receiving, by the processor, the second speech-based user input, wherein the second speech-based user input is associated with the at least one dialog recommendation;
   performing, by the processor, automatic speech recognition of at least a part of the second speech-based user input to generate a second recognized input; and
   providing, by the processor, a second response to the second recognized input.

13. The method of claim 1, wherein the at least one dialog recommendation is delivered to the user device as an actionable message.

14. The method of claim 1, wherein the recognizing of the at least a part of the speech-based user input to generate a recognized input includes performing automatic speech recognition utilizing one or more speech recognizers.

15. The method of claim 14, wherein the one or more speech recognizers include one or more of the following: a pattern-based speech recognizer, a free-dictation recognizer, an address book based recognizer, and a dynamically created recognizer.

16. A hardware-based chat information system (CIS), comprising:
- a speech recognition module configured to receive a speech-based user input and recognize at least a part of the speech-based user input and generate a recognized input;
- a dialog manager configured to generate at least one response to the recognized input;
- an event manager configured to monitor for occurrence of at least one triggering event and, based on the monitoring, identify the occurrence of the at least one triggering event, wherein identifying the occurrence of the at least one triggering event comprises recognizing one or more CIS operating modes, based on at least one of:
  - the one or more CIS operating modes having never been used by the user, and
  - the one or more CIS operating modes having not been used by the user over a predetermined period of time;
- a recommendation manager configured to generate at least one dialog recommendation based at least in part on the identification of the at least one triggering event, wherein the at least one dialog recommendation is related to the at least one triggering event; and
- an output renderer configured to:
  - provide the at least one response, and provide the at least one dialog recommendation separate from the at least one response,
  - receive, after the providing, either a selection of the dialog recommendation or a second speech-based user input that is based on a user speaking the at least one dialog recommendation, and
  - provide a corresponding response in response to the receiving, wherein the corresponding response corresponds to the at least one dialog recommendation, and wherein the corresponding response is provided when either of the selection or the second speech-based user input is received.

17. The CIS of claim 16, wherein the output renderer includes a text-to-speech generator.

18. The CIS of claim 16, wherein the output renderer is configured to provide the at least one response as an audio message.

19. The CIS of claim 16, wherein the output renderer is configured to provide the at least one dialog recommendation as a text message or an image message.

20. The CIS of claim 16, wherein the speech recognition module includes a plurality of speech recognizers.

21. The CIS of claim 16, wherein at least one of the speech recognition module, the dialog manager, the event manager, and the recommendation manager is a distributed computing module.

22. The CIS of claim 16, wherein at least one of the speech recognition module, the dialog manager, the event manager, and the recommendation manager is a cloud computing module.

23. A non-transitory processor-readable medium having instructions stored thereon, which when executed by one or more processors, cause the one or more processors to implement a method for delivering dialog recommendations in a hardware-based chat information system (CIS), the method comprising:
- receiving a speech-based user input;
- recognizing at least a part of the speech-based user input to generate a recognized input;
- providing, for presentation via a user device in response to the speech-based user input, at least one response to the recognized input;
- monitoring for occurrence of at least one triggering event;
- identifying at least one triggering event based on the monitoring, wherein identifying the occurrence of the at least one triggering event comprises recognizing one or more CIS operating modes, based on at least one of:
  - the one or more CIS operating modes having never been used by the user,
  - the one or more CIS operating modes having not been used by the user over a predetermined period of time;
- based at least in part on the identification, generating at least one dialog recommendation that is related to the at least one triggering event;
- presenting the at least one dialog recommendation to a user via the user device, wherein the at least one dialog recommendation is presented via the user device separate from the at least one response;
- receiving either a selection of the dialog recommendation or a second speech-based user input that is based on a user speaking the at least one dialog recommendation; and
- providing a corresponding response in response to the receiving, wherein the corresponding response corresponds to the at least one dialog recommendation, and wherein either of selecting the dialog recommendation and speaking the dialog recommendation causes a corresponding response to be provided.

* * * * *